United States Patent
Suzuki et al.

(10) Patent No.: US 10,421,145 B2
(45) Date of Patent: Sep. 24, 2019

(54) METHOD FOR PRODUCING CIRCUMFERENTIAL WELD JOINT FOR LOW-CARBON MARTENSITIC STAINLESS STEEL PIPES

(71) Applicant: JFE STEEL CORPORATION, Tokyo (JP)

(72) Inventors: Takeshi Suzuki, Handa (JP); Yukio Miyata, Handa (JP); Hiroki Ota, Handa (JP); Shinsuke Ide, Handa (JP)

(73) Assignee: JFE Steel Corporation, Tokyo (JP)

( * ) Notice: Subject to any disclaimer, the term of this patent is extended or adjusted under 35 U.S.C. 154(b) by 322 days.

(21) Appl. No.: 15/532,293

(22) PCT Filed: Dec. 1, 2015

(86) PCT No.: PCT/JP2015/005970
§ 371 (c)(1),
(2) Date: Jun. 1, 2017

(87) PCT Pub. No.: WO2016/088364
PCT Pub. Date: Jun. 9, 2016

(65) Prior Publication Data
US 2017/0355038 A1    Dec. 14, 2017

(30) Foreign Application Priority Data
Dec. 2, 2014    (JP) .................... 2014-243650

(51) Int. Cl.
| | | |
|---|---|---|
| *B23K 9/23* | (2006.01) | |
| *B23K 35/30* | (2006.01) | |
| *B23K 31/00* | (2006.01) | |
| *C22C 38/00* | (2006.01) | |
| *C22C 38/40* | (2006.01) | |
| *C22C 38/58* | (2006.01) | |
| *B23K 9/028* | (2006.01) | |
| *C21D 6/00* | (2006.01) | |
| *C21D 9/08* | (2006.01) | |
| *C22C 38/02* | (2006.01) | |
| *C22C 38/04* | (2006.01) | |
| *C22C 38/42* | (2006.01) | |
| *C22C 38/44* | (2006.01) | |
| *C22C 38/46* | (2006.01) | |
| *C22C 38/50* | (2006.01) | |

(Continued)

(52) U.S. Cl.
CPC .............. *B23K 9/23* (2013.01); *B23K 9/0282* (2013.01); *B23K 31/00* (2013.01); *B23K 35/30* (2013.01); *B23K 35/3086* (2013.01); *C21D 6/004* (2013.01); *C21D 6/005* (2013.01); *C21D 6/008* (2013.01); *C21D 9/08* (2013.01); *C22C 38/00* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/40* (2013.01); *C22C 38/42* (2013.01); *C22C 38/44* (2013.01); *C22C 38/46* (2013.01); *C22C 38/50* (2013.01); *C22C 38/58* (2013.01); *B23K 2101/06* (2018.08); *B23K 2103/05* (2018.08); *C21D 2211/008* (2013.01)

(58) Field of Classification Search
CPC .... B23K 9/23; B23K 9/0282; B23K 35/3086; B23K 31/00; B23K 35/30; B23K 2103/05; B23K 2101/06; C22C 38/44; C22C 38/001; C22C 38/002; C22C 38/004; C22C 38/005; C22C 38/02; C22C 38/04; C22C 38/42; C22C 38/50; C22C 38/46; C22C 38/58; C22C 38/40; C22C 38/00; C21D 6/004; C21D 6/005; C21D 6/008; C21D 9/08; C21D 2211/008
See application file for complete search history.

(56) References Cited

U.S. PATENT DOCUMENTS

| | | |
|---|---|---|
| 2009/0026188 A1 | 1/2009 | Schorghuber |
| 2015/0176926 A1 | 6/2015 | Asai et al. |

FOREIGN PATENT DOCUMENTS

| | | |
|---|---|---|
| EP | 1112804 A2 | 7/2001 |
| JP | 0499154 A | 3/1992 |

(Continued)

OTHER PUBLICATIONS

International Search Report and Written Opinion for International Application No. PCT/JP2015/005970, dated Mar. 8, 2016—5 Pages.

(Continued)

*Primary Examiner* — Anthony J Zimmer
(74) *Attorney, Agent, or Firm* — RatnerPrestia

(57) ABSTRACT

Provided is a method for producing a circumferential weld joint. With this method, when low-carbon martensitic stainless steel pipes used for pipelines for transportation of petroleum and natural gas are subjected to circumferential welding, the circumferential welding can be performed efficiently using a low-cost welding material having a composition similar to the composition of the low-carbon martensitic stainless steel pipes. Pipe ends of low-carbon martensitic stainless steel pipes containing prescribed components are butted against each other and subjected to multi-pass arc welding using a welding material containing prescribed components. In the first pass in the multi-pass arc welding, CMT welding is performed in which the welding material is moved back and forth against a molten pool to generate an arc intermittently. In the second and subsequent passes, one selected from GMA welding, GTA welding, and the CMT welding is performed.

4 Claims, No Drawings

(51) Int. Cl.
*B23K 101/06* (2006.01)
*B23K 103/04* (2006.01)

(56) References Cited

FOREIGN PATENT DOCUMENTS

| JP | 0499155 | A | 3/1992 |
|----|---------|---|--------|
| JP | 07185879 | A | 7/1995 |
| JP | 2000158183 | A | 6/2000 |
| JP | 2001246494 | A | 9/2001 |
| JP | 2002137058 | A | 5/2002 |
| JP | 3576472 | B2 | 10/2004 |
| JP | 2008542027 | A | 11/2008 |
| JP | 2011161459 | A | 8/2011 |
| JP | 2014163587 | A | 9/2014 |
| WO | 2014129199 | A1 | 8/2014 |

OTHER PUBLICATIONS

Extended European Search Report for European Application No. 15866042.3, dated Nov. 13, 2017, 7 pages.
Rosu, R.A. et al., "Structural and mechanical characterization of stainless steel joints realized by CMT process," Jan. 3, 2012, pp. 161-172, vol. 498, XP055403866, doi: 10.4028/www/scientific.net/KEM.498.161, Key Engineering Materials.
Talalaev R., et al., "Cold metal transfer (CMT) welding of thin sheet metal products," Jan. 1, 2012, pp. 243-250, vol. 18(3), XP055403867, ISSN: 1736-6038, doi: 10.3176/eng.2012.3.09, Estonian Journal of Emgineering.

METHOD FOR PRODUCING CIRCUMFERENTIAL WELD JOINT FOR LOW-CARBON MARTENSITIC STAINLESS STEEL PIPES

CROSS REFERENCE TO RELATED APPLICATIONS

This is the U.S. National Phase application of PCT/JP2015/005970, filed Dec. 1, 2015, which claims priority to Japanese Patent Application No. 2014-243650, filed Dec. 2, 2014, the disclosures of these applications being incorporated herein by reference in their entireties for all purposes.

TECHNICAL FIELD OF THE INVENTION

The present invention relates to a method for producing a circumferential weld joint for low-carbon martensitic stainless steel pipes and more particularly to a method for producing a circumferential weld joint excellent in strength, toughness, and corrosion resistance.

BACKGROUND OF THE INVENTION

Steel pipes made of carbon steel and low-alloy steel are widely used for steel pipes used for transportation of petroleum and natural gas. In recent years, there is an increasing tendency that extracted petroleum or natural gas contains wet carbon dioxide gas and hydrogen sulfide, and a problem arises in that the carbon dioxide gas and the hydrogen sulfide cause severe corrosion of the steel pipes.

In one technique developed to address the above problem, a corrosion inhibitor is added in the course of production of a steel pipe to prevent corrosion. However, the addition of the corrosion inhibitor not only results in an increase in the production cost of the steel pipe but also causes a new problem in that environmental pollution occurs due to the corrosion inhibitor. Accordingly, there is a need for a technique for improving the corrosion resistance of steel pipes without addition of the corrosion inhibitor.

A technique for producing a steel pipe made of duplex stainless steel has been investigated. The duplex stainless steel is a well-known material excellent in corrosion resistance, and the technique for producing a steel pipe made of the duplex stainless steel is a technique for improving the corrosion resistance of the steel pipe by utilizing the properties of the duplex stainless steel. However, since the duplex stainless steel is expensive, there is still a problem in that the production cost of the steel pipe increases.

In one steel pipe production technique investigated to address the above problem, low-carbon martensitic stainless steel that is lower in cost than the duplex stainless steel and has moderate corrosion resistance is used as the raw material of the steel pipe.

For example, Patent Literatures 1 and 2 disclose low-carbon martensitic stainless steel pipes which contain reduced amounts of C and N and about 11 to 14% Cr by mass and to which an austenite-stabilizing element is added. Since these steel pipes contain reduced amounts of C and N, they have an advantage in that their weldability is improved.

Generally, when a pipeline is constructed, ends of steel pipes are butted against one another and subjected to circumferential welding to thereby connect a large number of steel pipes. With the technique described in Patent Literatures 1 and 2, weldability is improved, so that preheating before the circumferential welding and heat treatment after the circumferential welding (hereinafter referred to as post-welding heat treatment) can be omitted. This can improve the working efficiency of the circumferential welding.

As for the working efficiency of the circumferential welding, it is necessary to improve the working efficiency of the circumferential welding in pipeline laying work to complete the work in a short time. In particular, when a submarine pipeline is laid, circumferential welding is performed on a pipe-laying vessel. Since the cost of the pipe-laying vessel is high, it is very important to complete the circumferential welding in a short time. There is therefore a need for a welding material that requires no preheating and no post-welding heat treatment.

When line pipes are laid in a cold region, it is necessary to use a welding material for obtaining a weld metal that exhibits excellent toughness at low temperature (e.g., −40° C.).

In this regard, welding materials (so-called welding wires) including various components have been practically used for circumferential welding of steel pipes.

When a martensitic stainless steel-made welding material is used for circumferential welding of the low-carbon martensitic stainless steel pipes disclosed in Patent Literatures 1 and 2, the weld metal is very hard, and this causes deterioration in toughness. Therefore, preheating and post-welding heat treatment must be performed, and this causes a problem in that the working efficiency of the circumferential welding is reduced.

When an austenitic stainless steel-made or Ni-based super alloy-made welding material is used for circumferential welding of the low-carbon martensitic stainless steel pipes disclosed in Patent Literatures 1 and 2, a problem arises in that the strength of the weld metal is likely to be lower than the strength of the base metal (so-called undermatching occurs). When a welding material made of 22Cr duplex stainless steel (22 mass % Cr-6 mass % Ni-3 mass % Mo) is used, it is difficult for the welding metal to ensure general X80-grade strength required of the low-carbon martensitic stainless steel pipes. When a welding material made of 25Cr duplex stainless steel (25 mass % Cr-7 mass % Ni-4 mass % Mo) is used, the X80-grade strength can be obtained because the strength of the weld metal is more increased than the strength of the base metal (so-called overmatching occurs). However, the cost of the circumferential welding work increases.

Generally, a reduction in strength of duplex stainless steel due to an increase in temperature is larger than that of martensitic stainless steel. Therefore, when the above-described 25Cr duplex stainless steel-made welding material is used, although the weld metal is overmatched at room temperature, undermatching is likely to occur at 100 to 200° C. When a duplex stainless steel-made welding material is used, selective corrosion may occur because of the difference in components between the weld metal and the base metal.

Under the above circumstances, a technique has been investigated, which allows circumferential welding of low-carbon martensitic stainless steel pipes to be performed efficiently (i.e., allows preheating and post-welding heat treatment to be omitted) and can be used to obtain a weld metal having high strength, high toughness, and high corrosion resistance.

For example, Patent Literatures 3 and 4 disclose welding materials suitable for circumferential welding of low-carbon martensitic stainless steel pipes.

When the welding material disclosed in Patent Literature 3 is used to perform circumferential welding, the Charpy absorbed energy of the weld metal at 0° C. is about 100 J, and therefore the toughness of the weld metal is insufficient for use in pipelines laid in a cold region. Moreover, post-welding heat treatment for 1 hour or longer is necessary, and a reduction in working efficiency is unavoidable.

When the welding material disclosed in Patent Literature 4 is used to perform circumferential welding, a fracture transition temperature of −40° C. or lower can be obtained without preheating and post-welding heat treatment, and the effect of improving low-temperature toughness is recognized. However, the maximum absorbed energy (so-called upper shelf energy) of the weld metal is significantly lower than that of the low-carbon martensitic stainless steel pipes. Therefore, to use this welding material for pipelines in a cold region, there is a need for further improvement in toughness.

CITATION LIST

Patent Literature

PTL 1: Japanese Unexamined Patent Application Publication No. 4-99154
PTL 2: Japanese Unexamined Patent Application Publication No. 4-99155
PTL 3: Japanese Unexamined Patent Application Publication No. 7-185879
PTL 4: Japanese Patent No. 3576472

SUMMARY OF THE INVENTION

It is an object of aspects of the present invention to solve the problems in the conventional techniques and to provide a method for producing a circumferential weld joint including a weld metal having high strength, high toughness, and high corrosion resistance. This method allows preheating to be omitted and therefore allows circumferential welding to be performed efficiently on low-carbon martensitic stainless steel pipes suitable for steel pipes (so-called line pipes) used in pipelines for transportation of petroleum and natural gas.

To solve the above problems, the present inventors have conducted extensive studies on factors affecting the properties, particularly toughness, of a circumferential weld joint for low-carbon martensitic stainless steel pipes that uses a martensitic stainless steel welding material. As a result of the studies, the inventors have found the following (A) and (B).

(A) By reducing the total content of C and N in the welding material to 0.02% by mass or less, the toughness of the weld metal can be improved.

(B) By combining the components of the steel pipes and the components of the welding material suitably such that an X value computed using formula (1) below is adjusted to more than 0 and 5.0 or less, the effect of preventing selective corrosion of the weld metal is further improved. In particular, selective corrosion in a low-pH chloride solution such as an aqueous NaCl solution saturated with carbon dioxide gas can be significantly reduced.

In formula (1), $Cr_W$, $Ni_W$, $Mo_W$, and $Cu_W$ are contents (% by mass) of corresponding elements in the weld metal, and $Cr_B$, $Ni_B$, $Mo_B$, and $Cu_B$ are contents (% by mass) of corresponding elements in the low-carbon martensitic stainless steel pipes (hereinafter referred to also as base metal portions). The content of an element not contained is set to zero.

$$X=(Cr_W-Cr_B)+(Ni_W-Ni_B)/2+(Mo_W-Mo_B)+(Cu_W-Cu_B)/4 \quad (1)$$

The present inventors have also found the following (C) and (D).

(C) The toughness of a circumferential weld joint produced through a plurality of weld passes varies greatly depending on the processing conditions of the first pass. By performing, in the first pass, CMT (Cold Metal Transfer) welding in which the welding material is moved back and forth against the molten pool to generate an arc intermittently, the properties of the weld metal, particularly its low-temperature toughness and low-temperature fracture toughness, are significantly improved.

(D) The effect of improving the properties of the weld metal is obtained at a practically acceptable level without preheating and post-welding heat treatment. The effect is more significant when the post-welding heat treatment is performed.

Aspects of the present invention have been made based on the above findings.

Accordingly, one aspect of the present invention is a method for producing a circumferential weld joint for low-carbon martensitic stainless steel pipes, the method including the steps of:
butting pipe ends of low-carbon martensitic stainless steel pipes each other;
performing multi-pass arc welding using a welding material, the multi-pass arc welding including a plurality of weld passes along a butted portion between the pipe ends in a circumferential direction to form a circumferential weld joint between the low-carbon martensitic stainless steel pipes,
a first pass in the multi-pass arc welding including CMT welding in which the welding material is moved back and forth against a molten pool to generate an arc intermittently,
second and subsequent passes in the multi-pass arc welding including one selected from GMA welding, GTA welding, and the CMT welding,
wherein the low-carbon martensitic stainless steel pipes has a composition containing:
C: 0.05% by mass or less;
Cr: 10 to 14% by mass; and
Ni: 1.0 to 7.0% by mass, or
a composition containing:
in addition to the C; the Cr; and the Ni;
Mo: 0.2 to 3.5% by mass; and/or
Cu: 0.02 to 2.0% by mass, and
wherein the welding material has a composition containing:
C and N in a total amount in the range of 0.02% by mass or less;
Si in the range of 0.5% by mass or less;
Mn in the range of 0.2 to 3% by mass;
Cr in the range of 11 to 15% by mass; and
Ni in the range of 2 to 8% by mass;
with the balance being Fe and unavoidable impurities; or
a composition containing:
in addition to the C, the N, the Si, the Mn, the Cr, and the Ni;
Cu in the range of 0.02 to 2% by mass;
Mo in the range of 2.0 to 4% by mass; and
V and Ti in a total amount in the range of 0.03 to 0.3% by mass;
with the balance being Fe and unavoidable impurities,
wherein the composition of the welding material is adjusted such that an X value satisfies formula (2):

$$0<X\leq5.0, \quad (2)$$

the X value being computed by formula (1):

$$X=(Cr_W-Cr_B)+(Ni_W-Ni_B)/2+(Mo_W-Mo_B)+(Cu_W-Cu_B)/4, \quad (1)$$

the X value being computed by formula (1) from the Cr content $Cr_W$, the Ni content $Ni_W$, the Mo content $Mo_W$, the Cu content $Cu_W$ of a weld metal of the circumferential weld joint, and the Cr content $Cr_B$, the Ni content $Ni_B$, the Mo content $Mo_B$ and the Cu content $Cu_B$ of the low-carbon martensitic stainless steel pipes, where $Cr_W$, $Ni_W$, $Mo_W$, and $Cu_W$ are the contents (% by mass) of corresponding elements in the weld metal, $Cr_B$, $Ni_B$, $Mo_B$, and $Cu_B$ are the contents (% by mass) of corresponding elements in the low-carbon martensitic stainless steel pipes, and provided that the content of an element not contained is set to zero.

In the method for producing a circumferential weld joint according to aspects of the present invention, it is preferable to apply post-welding heat treatment to the circumferential weld joint after the multi-pass arc welding. It is also preferable that the composition of the welding material for the circumferential weld joint further contains REM in the range of 0.3% by mass or less.

According to aspects of the present invention, a circumferential weld joint including a weld metal excellent in strength and corrosion resistance and having high toughness can be obtained by subjecting low-carbon martensitic stainless steel pipes to circumferential welding. Since preheating can be omitted, the circumferential weld joint can be obtained efficiently, so that industrially significant effects can be achieved.

DETAILED DESCRIPTION OF EMBODIMENTS OF THE INVENTION

In the circumferential weld joint production method according to aspects of the present invention, pipe ends of low-carbon martensitic stainless steel pipes (hereinafter may be denoted as base metals) having a composition containing C: 0.05% by mass or less, Cr: 10 to 14% by mass, and Ni: 1.0 to 7.0% by mass, or a composition containing, in addition to these C, Cr, and Ni, Mo: 0.2 to 3.5% by mass and/or Cu: 0.02 to 2.0% by mass are butted against each other, and then multi-pass arc welding including a plurality of weld passes is performed along the butted portion in its circumferential direction to thereby form a circumferential weld joint between the low-carbon martensitic stainless steel pipes.

In accordance with aspects of the present invention, a welding material used in this case has a composition containing C and N in a total amount in the range of 0.02% by mass or less, Si in the range of 0.5% by mass or less, Mn in the range of 0.2 to 3% by mass, Ni in the range of 2 to 8% by mass, and Cr in the range of 11 to 15% by mass with the balance being Fe and unavoidable impurities or a composition containing, in addition to these C, N, Si, Mn, Cr, and Ni, Cu in the range of 0.02 to 2% by mass, Mo in the range of 2.0 to 4% by mass, and V and Ti in a total amount in the range of 0.03 to 0.3% by mass with the balance being Fe and unavoidable impurities. The composition of the welding material is adjusted such that an X value satisfies formula (2) below. The X value is computed from formula (1) below using the Cr content $Cr_W$ of the weld metal of the circumferential weld joint, the Ni content $Ni_W$ of the weld metal, the Mo content $Mo_W$ of the weld metal, the Cu content $Cu_W$ of the weld metal, the Cr content $Cr_B$ of the low-carbon martensitic stainless steel pipes, the Ni content $Ni_B$ of the low-carbon martensitic stainless steel pipes, the Mo content $Mo_B$ of the low-carbon martensitic stainless steel pipes, and the Cu content $Cu_B$ of the low-carbon martensitic stainless steel pipes.

$$X=(Cr_W-Cr_B)+(Ni_W-Ni_B)/2+(Mo_W-Mo_B)+(Cu_W-Cu_B)/4 \quad (1)$$

$$0<X\leq5.0 \quad (2)$$

$Cr_W$, $Ni_W$, $Mo_W$, and $Cu_W$: Contents (% by mass) of corresponding elements in the weld metal.

$Cr_B$, $Ni_B$, $MO_B$, and $Cu_B$: Contents (% by mass) of corresponding elements in the low-carbon martensitic stainless steel pipes.

The content of an element not contained is set to zero.

In the first pass in the multi-pass arc welding, CMT (Cold Metal Transfer) welding is performed in which the welding material is moved back and forth against a molten pool to generate an arc intermittently. In the second and subsequent passes, one selected from GMA (Gas Metal Arc) welding, GTA (Gas Tungsten Arc) welding, and the CMT welding is performed.

First, the components of the low-carbon martensitic stainless steel pipes (base metals) to which aspects of the present invention are applied will be described.

C: 0.05% by mass or less

C is an element that improves the strength of the base metals. However, if the content of C exceeds 0.05% by mass, not only the toughness of the base metals deteriorates, but also the weldability in the circumferential welding deteriorates. Therefore, the content of C is 0.05% by mass or less. Preferably, the content of C is 0.020% by mass or less. To ensure the strength of the base metals, it is preferable that the content of C is 0.002% by mass or more.

The contents of other elements are in the same ranges as those for components of well-known low-carbon martensitic stainless steel, i.e., Cr: 10 to 14% by mass and Ni: 1.0 to 7.0% by mass. In addition to these C, Cr, and Ni, Mo: 0.2 to 3.5% by mass and/or Cu: 0.02 to 2.0% by mass may be contained. Moreover, it is preferable that Si: 1.0% by mass or less, Mn: 0.1 to 3.0% by mass or less, P: 0.03% by mass or less, S: 0.01% by mass or less, and N: 0.1% by mass or less are satisfied. In particular, N is an element that improves the strength of the base metals, as does C. However, if the content of N is excessively large, not only the toughness of the base metals deteriorates, but also the weldability in the circumferential welding is deteriorates. Therefore, the content of N is preferably 0.05% by mass or less and more preferably 0.020% by mass or less.

Next, the components of the welding material (so-called welding wire) used in accordance with aspects of the present invention will be described.

Total content of C and N: 0.02% by mass or less

C and N are elements that improve the strength of the weld metal. However, if the total content of C and N exceeds 0.02% by mass, the toughness of the weld metal deteriorates. Therefore, the total content of C and N is 0.02% by mass or less and is reduced as much as possible so long as the desired strength can be ensured. In terms of ensuring the strength of the weld metal, it is preferable that the total content of C and N is 0.01% by mass or more.

Si: 0.5% by mass or less

Si is an element that stabilizes a ferrite phase. If the content of Si exceeds 0.5% by mass, a δ-ferrite phase is likely to be formed, and this causes deterioration of the toughness of the weld metal. Therefore, the content of Si is 0.5% by mass or less. Si has a deoxidizing effect on the weld metal. Si also has the effect of stabilizing the arc in the circumferential welding to thereby improve workability. To obtain these effects, it is preferable that the content of Si is 0.01% by mass or more.

Mn: 0.2 to 3% by mass

Mn is an element having a deoxidizing effect on the weld metal and the effect of improving the strength of the weld metal. If the content of Mn is less than 0.2% by mass, these effects are not obtained. If the content of Mn exceeds 3% by mass, the strength of the welding material increases significantly, and this causes various problems in a production process. Therefore, the content of Mn is in the rage of 0.2 to 3% by mass. The content of Mn is preferably in the range of 0.5 to 2.5% by mass.

Ni: 2 to 8% by mass

Ni is an element that stabilizes an austenite phase and has the function of suppressing the formation of the δ-ferrite phase to thereby improve the toughness of the weld metal. If the content of Ni is less than 2% by mass, this effect is not obtained. If the content of Ni exceeds 8% by mass, the amount of retained austenite increases, and the strength of the weld metal deteriorates. Therefore, the content of Ni is in the range of 2 to 8% by mass. In terms of ensuring the toughness of the weld metal stably, the content of Ni is preferably in the range of 5 to 7.5% by mass. More preferably, the content of Ni is in the range of 5.0 to 7.0% by mass.

Cr: 11 to 15% by mass

Cr is an element that improves the corrosion resistance and strength of the weld metal. If the content of Cr is less than 11% by mass, this effect is not obtained. If the content of Cr exceeds 15% by mass, the δ-ferrite phase remains in the weld metal, and this may cause deterioration of the toughness of the weld metal. Therefore, the content of Cr is in the range of 11 to 15% by mass.

The balance other than the above components is Fe and unavoidable impurities. Among the unavoidable impurities, S: 0.01% by mass or less, P: 0.03% by mass or less, and O: 0.01% by mass or less are allowable.

The welding material used in accordance with aspects of the present invention may contain, in addition to the above components, components listed below.

Cu: 0.02 to 2% by mass

Cu is an element that improves the corrosion resistance and strength of the weld metal. If the content of Cu exceeds 2% by mass, the strength of the welding material increases significantly, and this may cause a problem in the production process. Therefore, preferably, the content of Cu is 2% by mass or less. More preferably, the content of Cu is 1.5% by mass or less. If the content of Cu is less than 0.02% by mass, the effect of improving the corrosion resistance and strength of the weld metal may not be obtained. Therefore, the content of Cu is preferably 0.02% by mass or more and more preferably 0.5% by mass or more.

Mo: 2.0 to 4% by mass

Mo is an element that improves the corrosion resistance and strength of the weld metal. If the content of Mo exceeds 4% by mass, the δ-ferrite phase may remain in the weld metal. If the content of Mo exceeds 4% by mass, an intermetallic compound may be formed, and the toughness of the weld metal may deteriorate. Therefore, preferably, the content of Mo is 4% by mass or less. More preferably, the content of Mo is 3.0% by mass or less. If the content of Mo is less than 2.0% by mass, the effect of improving the corrosion resistance and strength of the weld metal may not be obtained. Therefore, the content of Mo is 2.0% by mass or more.

Total content of V and Ti: 0.03 to 0.3% by mass

V and Ti are elements that form carbides and nitrides to thereby improve the strength of the weld metal. If the total content of V and Ti exceeds 0.3% by mass, the toughness of the weld metal may deteriorate significantly. Therefore, preferably, the total content of one or two of V and Ti is 0.3% by mass or less. More preferably, the total content of V and Ti is 0.15% by mass or less. If the total content of V and Ti is less than 0.03% by mass, the effect of the formation of carbides and nitrides may not be obtained. Therefore, preferably, the total content of V and Ti is 0.03% by mass or more.

REM: 0.3% by mass or less

REM (i.e., a rare earth element) is an element that has the function of stabilizing the arc in the circumferential welding to thereby improve workability and the function of suppressing the formation of oxides to thereby improve the toughness of the weld metal. In particular, when a welding material containing REM is used, the arc can be stabilized even in GMA welding in a pure inert gas atmosphere such as Ar or He that contains no active gases (such as $CO_2$ and $O_2$). This effect is likely to be obtained when the content of the REM is 0.01% by mass. Therefore, preferably, the content of the REM is 0.01% by mass. If the content of the REM exceeds 0.3% by mass, the toughness of the weld metal deteriorates. Therefore, preferably, the content of the REM is 0.3% by mass or less.

The contents of Cr, Ni, Mo, and Cu in the welding material are selected within the above-described ranges such that the X value computed from formula (1) that defines the mutual relationship among Cr, Ni, Mo, and Cu in the base metals and Cr, Ni, Mo, and Cu in the weld metal satisfies formula (2). In this case, it is preferable that the contents of Cr, Ni, Mo, and Cu in the weld metal are first estimated based on the dilution ratio of the base metals that is estimated from the setting conditions of the circumferential welding and then the welding material is selected based on the estimated contents. In formula (1), $Cr_W$, $Ni_W$, $Mo_W$, and $Cu_W$ are the contents (% by mass) of corresponding elements in the weld metal, and $Cr_B$, $Ni_B$, $Mo_B$, and $Cu_B$ are the contents (% by mass) of corresponding elements in the base metals.

$$X = (Cr_W - Cr_B) + (Ni_W - Ni_B)/2 + (Mo_W - Mo_B) + (Cu_B - Cu_B)/4 \quad (1)$$

$$0 < X \leq 5.0 \quad (2)$$

If the X value is 0 or less, the weld metal is electrically less noble than the base metals, and selective corrosion occurs in the weld metal. If the X value exceeds 5.0, the weld metal is electrically nobler than the base metals, and selective corrosion occurs in the base metals and a weld-heat affected zone. When any of Cr, Ni, Mo, and Cu in the base metals and Cr, Ni, Mo, and Cu in the weld metal is not contained, the content of the element not contained is set to 0 (zero), and then the X value is computed. Preferably, X is 1.0 or more.

The contents of Cr, Ni, Mo, and Cu in the weld metal (i.e., $Cr_W$, $Ni_W$, $Mo_W$, and $Cu_W$) can be measured as follows. For example, in a cross section of the weld metal that appears in a cross section (a so-called L cross section) of the weld joint obtained by cutting it in a direction parallel to the direction of the pipe axis of the base metals, a sample is taken such that its center is positioned at the center, with respect to the pipe axis direction of the base metals, of the weld metal and is located one-third of the wall thickness of the base metals from the inner side, and the contents are measured by a ZAF method using an electron probe micro analyzer (EPMA).

Next, the circumferential welding to which aspects of the present invention are applied will be described.

In the circumferential welding, multi-pass arc welding including a plurality of weld passes is performed. No particular limitation is imposed on the number of passes. However, in the first pass, CMT welding is performed in which the welding material is moved back and forth against the molten pool to generate an arc intermittently.

It is known that the properties of the circumferential weld joint, particularly its toughness, are improved by reducing gas components such as O (oxygen), N, and H in the weld metal and forming a sound back bead. However, in actual construction of pipelines etc., back shielding tends to be insufficient. When GTA welding is performed in the first pass with insufficient back shielding, gas components such as O, N, and H are mixed into the weld metal, and the properties of the circumferential weld joint deteriorate. When GMA welding is performed in the first pass, the length of the arc is reduced in order to stabilize the arc, so that it is difficult to obtain a sound back bead.

In the CMT welding, a short circuit between a consumable electrode and a molten pool is forcibly cut to thereby generate an arc intermittently. Therefore, in the circumferential welding of base metals with a small wall thickness, a molten pool with a shallow penetration shape can be obtained. In addition, since the consumable electrode is moved back and forth against the molten pool to forcibly repeat generation and cutting of the arc, the content of O (oxygen) in the shielding gas can be reduced. Consequently, the amount of oxide formed on the surface of the molten pool (i.e., a stable cathode spot) may be decreased, but the stability of the arc can be maintained. Since the circumferential welding is performed at relatively low temperature, the saturation solubility of the gas components in the molten pool is reduced. This provides the effect of reducing the amount of gas components picked up, the effect of stabilizing the shape of the bead, the effect of improving the properties of the weld metal, etc. In accordance with aspects of the present invention, because of the above reasons, the base metals used and the welding material used contain their respective specific components, and the CMT welding is used in the first pass. As for the conditions of the CMT welding, it is preferable to perform pulse welding using a base current of 80 A or less, a pulse current of 400 A or less, and a welding heat input of 15 kJ/cm or less.

For each of the second and subsequent passes, one is selected from the CMT welding, GMA welding using a copper backing strip and a shielding gas containing a reduced amount of O (oxygen), and GTA welding using back shielding with an inert gas according to, for example, a pipeline facility environment, and the selected one is performed.

By applying aspects of the present invention in the manner described above, while preheating of the ends of the base metals before the circumferential welding is omitted, a sound circumferential weld joint including a weld metal having high strength, high toughness, and high corrosion resistance can be obtained. Moreover, even when not only the preheating but also post-welding heat treatment is omitted, a weld metal having high strength, high toughness, and high corrosion resistance can be obtained. The omission of the preheating and the post-welding heat treatment contributes to an improvement in the working efficiency of the circumferential welding.

In accordance with aspects of the present invention, the post-welding heat treatment may be performed. By performing the post-welding heat treatment, a tempered martensite phase is formed in the weld metal and the weld-heat affected zone, and the weld metal obtained can have high strength, high toughness, and high corrosion resistance. When the post-welding heat treatment is performed, it is preferable to perform the heat treatment at 600 to 650° C. in order not to allow reverse transformation from the martensite phase to the austenite phase to proceed.

Even when the post-welding heat treatment is performed, it is unnecessary to perform preheating on the ends of the base metals.

EXAMPLES

Example 1

Seamless low-carbon martensitic stainless steel pipes (outer diameter: 219 mm, wall thickness: 12.7 mm) containing components shown in Table 1 were used as base metals, and pipe ends of the steel pipes were butted against each other and subjected to circumferential welding. In the circumferential welding, multi-pass arc welding was performed using a welding material (a welding wire having a diameter of 3.2 mm) containing components shown in Table 2. In the first pass, CMT welding with a heat input of 11 kJ/cm was performed. In the second to ninth passes, GTA welding with a heat input of 11 to 17 kJ/cm was performed in an Ar atmosphere. The circumferential weld joints obtained are shown in Table 3 as Inventive Examples (joint Nos. 1, 2, 5, 12, and 13). In the table, each X value was computed from the following formula (1).

$$X=(Cr_W-Cr_B)+(Ni_W-Ni_B)/2+(Mo_W-MO_B)+(Cu_W-Cu_B)/4 \quad (1)$$

The contents of Cr, Ni, Mo, and Cu in each weld metal (i.e., $Cr_W$, $Ni_W$, $Mo_W$, and $Cu_W$) were measured as follows. In a cross section of the weld metal that appeared in a cross section (a so-called L cross section) of the weld joint obtained by cutting it in a direction parallel to the direction of the pipe axis of the base metals, a sample was taken such that its center was positioned at the center, with respect to the pipe axis direction of the base metals, of the weld metal and was located one-third of the wall thickness of the base metals from the inner side, and the contents were measured by a ZAF method using an electron probe micro analyzer (EPMA).

TABLE 1

| Base metal | Component composition (% by mass) | | | | | | | | | | | |
|---|---|---|---|---|---|---|---|---|---|---|---|---|
| | C | Si | Mn | P | S | Cr | Ni | Mo | Cu | V | Ti | N |
| 1 | 0.008 | 0.15 | 0.56 | 0.014 | 0.001 | 12.1 | 6.02 | 2.54 | 0.05 | 0.015 | 0.098 | 0.008 |
| 2 | 0.012 | 0.20 | 0.51 | 0.013 | 0.001 | 12.1 | 5.01 | 2.01 | 0.04 | 0.013 | 0.095 | 0.007 |
| 3 | 0.010 | 0.10 | 0.38 | 0.018 | 0.002 | 12.2 | 6.10 | 2.51 | — | 0.008 | 0.088 | 0.007 |
| 4 | 0.011 | 0.25 | 0.42 | 0.012 | 0.001 | 12.3 | 6.21 | — | 0.35 | 0.019 | 0.112 | 0.012 |
| 5 | 0.012 | 0.22 | 0.61 | 0.010 | 0.001 | 12.1 | 5.19 | — | — | 0.012 | 0.090 | 0.009 |

In each component composition, the balance is Fe and unavoidable impurities.

TABLE 2

| Welding material | Component composition (% by mass) | | | | | | | | | | | | | |
|---|---|---|---|---|---|---|---|---|---|---|---|---|---|---|
| | C | Si | Mn | P | S | Cr | Ni | Mo | Cu | V | Ti | N | REM | C + N |
| A | 0.006 | 0.20 | 0.65 | 0.014 | 0.002 | 12.3 | 6.05 | 2.48 | 0.11 | 0.015 | 0.098 | 0.008 | — | 0.014 |
| B | 0.007 | 0.18 | 0.67 | 0.014 | 0.002 | 12.4 | 5.98 | 2.47 | 0.15 | 0.013 | 0.102 | 0.008 | 0.082 | 0.015 |
| C | 0.005 | 0.20 | 0.63 | 0.012 | 0.001 | 12.2 | 5.21 | 2.03 | 0.13 | 0.015 | 0.095 | 0.005 | 0.076 | 0.010 |
| D | 0.008 | 0.21 | 0.63 | 0.011 | 0.001 | 13.3 | 7.47 | 3.01 | 0.22 | 0.014 | 0.099 | 0.009 | — | 0.017 |
| E | 0.007 | 0.23 | 0.55 | 0.011 | 0.001 | 14.9 | 6.94 | 2.93 | 1.48 | 0.013 | 0.089 | 0.008 | — | 0.015 |
| F | 0.007 | 0.22 | 0.61 | 0.011 | 0.002 | 14.2 | 7.13 | — | — | — | — | 0.009 | — | 0.016 |
| G | 0.008 | 0.23 | 0.52 | 0.013 | 0.001 | 12.2 | 7.23 | 2.08 | 0.12 | — | — | 0.008 | — | 0.016 |
| H | 0.006 | 0.21 | 0.62 | 0.012 | 0.001 | 12.3 | 6.24 | 2.48 | 0.14 | 0.016 | 0.001 | 0.007 | — | 0.013 |
| I | 0.007 | 0.20 | 0.62 | 0.013 | 0.001 | 12.1 | 6.18 | 2.52 | 0.11 | — | 0.103 | 0.007 | — | 0.014 |

In each component composition, the balance is Fe and unavoidable impurities.

In circumferential welding performed for comparison purposes, GTA welding with a heat input of 11 to 17 kJ/cm in an argon atmosphere was performed in all the first to ninth passes. The circumferential weld joints obtained are shown in Table 3 as Comparative Examples (joint Nos. 3 and 4).

The groove shape of each of the joint Nos. 1 to 5, 12, and 13 shown in Table 3 was a V groove having a groove angel of 30°. For all the joints, no preheating was performed before the circumferential welding. For each of joint Nos. 2 and 13, post-welding heat treatment was performed at 650° C. for 10 minutes.

Test pieces conforming to API standard 1104 were taken from each of the thus-produced circumferential weld joints. A tensile test was performed to examine the tensile properties of the circumferential weld joint. A Charpy impact test was performed to examine the low-temperature toughness of the circumferential weld joint. A CTOD test conforming to BS7448 was performed to examine the fracture toughness of the circumferential weld joint. The results are also shown in Table 3.

The fracture position of each circumferential weld joint was evaluated as follows. A circumferential weld joint fractured at a portion other than the weld metal was rated "good," and a circumferential weld joint fractured at the weld metal was rated "poor." In all the joints, no fracture occurred in their weld metal. As for the results of the Charpy impact test, the absorbed energy at −40° C. is represented by $vE_{-40}$. The low-temperature toughness of each circumferential weld joint was evaluated as follows. A circumferential weld joint with a $vE_{-40}$ of 150 J or more was rated "good," and a circumferential weld joint with a $vE_{-40}$ of less than 150 J was rated "poor." As for the results of the CTOD test, a CTOD value at −40° C. is represented by $\delta_{-40}$. The low-temperature fracture toughness of each circumferential weld joint was evaluated as follows. A circumferential weld joint with a $\delta_{-40}$ of 0.15 mm or more was rated "good," and a circumferential weld joint with a $\delta_{-40}$ of less than 0.15 mm was rated "poor."

A corrosion test was performed on each circumferential weld joint. In the corrosion test, a test piece was immersed

TABLE 3

| Joint No. | Base metal | Welding material | X value*1 | First pass | Second pass | Third and subsequent passes | Post-welding heat treatment | TS (MPa) |
|---|---|---|---|---|---|---|---|---|
| 1 | 1 | A | 0.17 | CMT | GTA | GTA | No | 821 |
| 2 | 1 | A | 0.16 | CMT | GTA | GTA | Yes | 821 |
| 3 | 1 | A | 0.15 | GTA | GTA | GTA | No | 826 |
| 4 | 1 | A | 0.16 | GTA | GTA | GTA | Yes | 818 |
| 5 | 1 | B | 0.24 | CMT | GTA | GTA | No | 821 |
| 12 | 2 | A | 0.19 | CMT | GTA | GTA | No | 811 |
| 13 | 2 | A | 1.21 | CMT | GTA | GTA | Yes | 808 |

| Joint No. | Evaluation of fracture position | $vE_{-40}$ (J) | Evaluation of low-temperature toughness | $\delta_{-40}$ (mm) | Evaluation of fracture toughness | Evaluation of corrosion resistance | Remarks |
|---|---|---|---|---|---|---|---|
| 1 | Good | 182 | Good | 0.388 | Good | Good | Inventive Example |
| 2 | Good | 210 | Good | 0.458 | Good | Good | Inventive Example |
| 3 | Good | 131 | Poor | 0.108 | Poor | Good | Comparative Example |
| 4 | Good | 164 | Good | 0.141 | Poor | Good | Comparative Example |
| 5 | Good | 181 | Good | 0.310 | Good | Good | Inventive Example |
| 12 | Good | 191 | Good | 0.417 | Good | Good | Inventive Example |
| 13 | Good | 218 | Good | 0.459 | Good | Good | Inventive Example |

*1 $X = (Cr_W - Cr_B) + (Ni_W - Ni_B)/2 + (Mo_W - Mo_B) + (Cu_W - Cu_B)/4$ ... (1)

In Table 3, the tensile strength of each circumferential weld joint measured in the tensile test is represented by TS. in a 10 mass % aqueous NaCl solution (solution temperature: 150° C.) saturated with carbon dioxide gas at 5.0 MPa (immersion time: 168 hours), and the presence or absence of selective corrosion in the circumferential weld joint was checked visually and under an optical microscope. The selective corrosion means that, when the degree of corrosion of the weld metal, the degree of corrosion of the weld-heat affected zone, and the degree of corrosion of the base metals are compared, the degree of corrosion is higher in one or two of these portions than in the other portion(s). The corrosion resistance was evaluated as follows. A circumferential weld joint with no selective corrosion was rated "good," and a circumferential weld joint with selective corrosion was rated "poor."

As is clear in Table 3, in each of the circumferential weld joints in the Inventive Examples (joint Nos. 1, 2, 5, 12, and 13), the weld metal obtained had excellent strength and toughness (i.e., low-temperature toughness and low-temperature fracture toughness) without the need for preheating, and no selective corrosion was found. When the post-welding heat treatment was performed (joint Nos. 2 and 13), the weld metals obtained similarly had excellent strength and toughness, and no selective corrosion was found.

However, in each of the circumferential weld joints in the Comparative Examples (joint Nos. 3 and 4), the low-temperature toughness and the low-temperature fracture toughness deteriorated because the GTA welding was performed in the first pass.

It has been verified that, when aspects of the present invention are applied in the manner described above, low-carbon martensitic stainless steel pipes can be subjected to circumferential welding efficiently and stably and a circumferential weld joint having excellent properties can be obtained.

Example 2

Seamless low-carbon martensitic stainless steel pipes (outer diameter: 219 mm, wall thickness: 12.7 mm) containing components shown in Table 1 were used as base metals, and pipe ends of the steel pipes were butted against each other and subjected to circumferential welding. In the circumferential welding, multi-pass arc welding was performed using a welding material (a welding wire having a diameter of 0.9 to 1.2 mm) containing components shown in Table 2. In the first and second passes, CMT welding was performed. In the third to ninth passes, GMA welding (shielding gas: Ar+30 vol % He, heat input: 12 to 22 kJ/cm) was performed. The circumferential weld joints obtained are shown in Table 4 as Inventive Examples (joint Nos. 6, 7, 14, and 15). Alternatively, the CMT welding was performed in the first pass, and the GMA welding (shielding gas: Ar+30 vol % He, heat input: 12 to 22 kJ/cm) was performed in the second to ninth passes. The circumferential weld joints obtained are shown in Table 4 as Inventive Examples (joint Nos. 8, 9, and 16 to 28) and Comparative Examples (joint Nos. 29 and 30).

In the table, each X value was computed from the following formula (1).

$$X=(Cr_W-Cr_B)+(Ni_W-Ni_B)/2+(Mo_W-Mo_B)+(Cu_W-Cu_B)/4$$

The contents of Cr, Ni, Mo, and Cu in each weld metal (i.e., $Cr_W$, $Ni_W$, $Mo_W$, and $Cu_W$) were measured as follows. In a cross section of the weld metal that appeared in a cross section (a so-called L cross section) of the weld joint obtained by cutting it in a direction parallel to the direction of the pipe axis of the base metals, a sample was taken such that its center was positioned at the center, with respect to the pipe axis direction of the base metals, of the weld metal and was located one-third of the wall thickness of the base metals from the inner side, and the contents were measured by a ZAF method using an electron probe micro analyzer (EPMA).

For comparison purposes, GMA welding (shielding gas: Ar+30 vol % He, heat input: 12 to 22 kJ/cm) was performed in all the first to ninth passes. The circumferential weld joints obtained are shown in Table 3 as Comparative Examples (joint Nos. 10 and 11).

The groove shape of each of the joint Nos. 6 to 11 and 14 to 30 shown in Table 4 was a V groove having a groove angel of 30°. For all the joints, no preheating was performed before the circumferential welding. For each of joint Nos. 7, 9, 15, and 17, post-welding heat treatment was performed at 650° C. for 10 minutes.

Test pieces were taken from each of the thus-produced circumferential weld joints, and the tensile test, the Charpy impact test, and the CTOD test were performed in the same manner as in Example 1. In addition, the presence or absence of selective corrosion was examined. These results are also shown in Table 3.

TABLE 4

| | | | | Welding conditions | | | | Properties of circumferential weld joint |
| --- | --- | --- | --- | --- | --- | --- | --- | --- |
| Joint No. | Base metal | Welding material | X value*1 | First pass | Second pass | Third and subsequent passes | Post-welding heat treatment | TS (MPa) |
| 6 | 1 | B | 0.23 | CMT | CMT | GMA | No | 824 |
| 7 | 1 | B | 0.24 | CMT | CMT | GMA | Yes | 814 |
| 8 | 1 | B | 0.22 | CMT | GMA | GMA | No | 829 |
| 9 | 1 | B | 0.23 | CMT | GMA | GMA | Yes | 817 |
| 10 | 1 | B | 0.22 | GMA | GMA | GMA | No | 831 |
| 11 | 1 | B | 0.22 | GMA | GMA | GMA | Yes | 821 |
| 14 | 2 | A | 1.20 | CMT | CMT | GMA | No | 811 |
| 15 | 2 | A | 1.20 | CMT | CMT | GMA | Yes | 807 |
| 16 | 2 | B | 1.25 | CMT | GMA | GMA | No | 817 |
| 17 | 2 | B | 1.24 | CMT | GMA | GMA | Yes | 808 |
| 18 | 2 | C | 0.23 | CMT | GMA | GMA | No | 812 |
| 19 | 1 | D | 2.41 | CMT | GMA | GMA | No | 845 |
| 20 | 2 | D | 3.44 | CMT | GMA | GMA | No | 841 |
| 21 | 1 | E | 3.95 | CMT | GMA | GMA | No | 861 |
| 22 | 3 | A | 0.07 | CMT | GMA | GMA | No | 815 |
| 23 | 4 | A | 2.34 | CMT | GMA | GMA | No | 806 |

TABLE 4-continued

| 24 | 1 | F | 0.10 | CMT | GMA | GMA | No | 818 |
| 25 | 1 | G | 0.25 | CMT | GMA | GMA | No | 820 |
| 26 | 1 | H | 0.26 | CMT | GMA | GMA | No | 817 |
| 27 | 1 | I | 0.08 | CMT | GMA | GMA | No | 822 |
| 28 | 5 | A | 3.11 | CMT | GMA | GMA | No | 801 |
| 29 | 1 | C | −0.78 | CMT | GMA | GMA | No | 822 |
| 30 | 2 | E | 5.02 | CMT | GMA | GMA | No | 856 |

| | Properties of circumferential weld joint | | | | | |
|---|---|---|---|---|---|---|
| Joint No. | Evaluation of fracture position | $vE_{-40}(J)$ | Evaluation of low-temperature toughness | $\delta_{-40}$ (mm) | Evaluation of fracture toughness | Evaluation of corrosion resistance | Remarks |
| 6 | Good | 169 | Good | 0.295 | Good | Good | Inventive Example |
| 7 | Good | 188 | Good | 0.367 | Good | Good | Inventive Example |
| 8 | Good | 153 | Good | 0.162 | Good | Good | Inventive Example |
| 9 | Good | 170 | Good | 0.254 | Good | Good | Inventive Example |
| 10 | Good | 113 | Poor | 0.087 | Poor | Good | Comparative Example |
| 11 | Good | 129 | Poor | 0.112 | Poor | Good | Comparative Example |
| 14 | Good | 175 | Good | 0.280 | Good | Good | Inventive Example |
| 15 | Good | 193 | Good | 0.420 | Good | Good | Inventive Example |
| 16 | Good | 171 | Good | 0.261 | Good | Good | Inventive Example |
| 17 | Good | 188 | Good | 0.365 | Good | Good | Inventive Example |
| 18 | Good | 195 | Good | 0.426 | Good | Good | Inventive Example |
| 19 | Good | 163 | Good | 0.152 | Good | Good | Inventive Example |
| 20 | Good | 165 | Good | 0.164 | Good | Good | Inventive Example |
| 21 | Good | 155 | Good | 0.161 | Good | Good | Inventive Example |
| 22 | Good | 165 | Good | 0.163 | Good | Good | Inventive Example |
| 23 | Good | 158 | Good | 0.151 | Good | Good | Inventive Example |
| 24 | Good | 175 | Good | 0.280 | Good | Good | Inventive Example |
| 25 | Good | 179 | Good | 0.308 | Good | Good | Inventive Example |
| 26 | Good | 171 | Good | 0.261 | Good | Good | Inventive Example |
| 27 | Good | 181 | Good | 0.309 | Good | Good | Inventive Example |
| 28 | Good | 161 | Good | 0.151 | Good | Good | Inventive Example |
| 29 | Good | 191 | Good | 0.413 | Good | Poor | Comparative Example |
| 30 | Good | 151 | Good | 0.158 | Good | Poor | Comparative Example |

*1X = $(Cr_W - Cr_B) + (Ni_W - Ni_B)/2 + (Mo_W - Mo_B) + (Cu_W - Cu_B)/4$ ... (1)

As is clear in Table 4, in each of the circumferential weld joints in the Inventive Examples (joint Nos. 6 to 9 and 14 to 28), the weld metal obtained had excellent strength and toughness (i.e., low-temperature toughness and low-temperature fracture toughness) without the need for preheating, and no selective corrosion was found. When the post-welding heat treatment was performed (joint Nos. 7, 9, 15, and 17), the low-temperature toughness and the low-temperature fracture toughness were further improved.

However, in each of the circumferential weld joints in Comparative Examples (joint Nos. 10 and 11), the low-temperature toughness and the low-temperature fracture toughness deteriorated because GTA welding was performed in the first pass. In the circumferential weld joint in a Comparative Example (joint No. 29), the X value was 0 or less, and selective corrosion occurred in the weld metal portion. In the circumferential weld joint in a Comparative Example (joint No. 30), the X value was more than 5.0, and selective corrosion occurred.

It has been verified that, when aspects of the present invention are applied in the manner described above, low-carbon martensitic stainless steel pipes can be subjected to circumferential welding efficiently and stably and a circumferential weld joint having excellent properties can be obtained.

The invention claimed is:
1. A method for producing a circumferential weld joint for low-carbon martensitic stainless steel pipes, the method comprising the steps of:
butting pipe ends of low-carbon martensitic stainless steel pipes with each other;
performing multi-pass arc welding using a welding material, the multi-pass arc welding including a plurality of weld passes along a butted portion between the pipe ends in a circumferential direction to form a circumferential weld joint between the low-carbon martensitic stainless steel pipes,
a first pass in the multi-pass arc welding including CMT welding in which the welding material is moved back and forth against a molten pool to generate an arc intermittently,
second and subsequent passes in the multi-pass arc welding including one selected from GMA welding, GTA welding, and the CMT welding,
wherein the low-carbon martensitic stainless steel pipes has a composition containing:
C: 0.05% by mass or less;
Cr: 10 to 14% by mass; and
Ni: 1.0 to 7.0% by mass or,
a composition containing:
in addition to the C; the Cr; and the Ni;
Mo: 0.2 to 3.5% by mass; and/or
Cu: 0.02 to 2.0% by mass, and
wherein the welding material has a composition containing:
C and N in a total amount in the range of 0.02% by mass or less;
Si in the range of 0.5% by mass or less;
Mn in the range of 0.2 to 3% by mass;
Cr in the range of 11 to 15% by mass; and
Ni in the range of 2 to 8% by mass;

with the balance being Fe and unavoidable impurities;
or a composition containing:
in addition to the C, the N, the Si, the Mn, the Cr, and the Ni;
optionally Cu in the range of 0.02 to 2% by mass;
optionally Mo in the range of 2.0 to 4% by mass; and
optionally V and Ti in a total amount in the range of 0.03 to 0.3% by mass;
with the balance being Fe and unavoidable impurities,
wherein the composition of the welding material is adjusted such that an X value satisfies formula (2):

$$0 < X \leq 5.0, \quad (2)$$

the X value being computed by formula (1):

$$X = (Cr_W - Cr_B) + (Ni_W - Ni_B)/2 + (Mo_W - Mo_B) + (Cu_W - Cu_B)/4, \quad (1)$$

where $Cr_W$, $Ni_W$, $Mo_W$, and $Cu_W$ are the contents (% by mass) of corresponding elements Cr, Ni, Mo, and Cu in the weld metal, $Cr_B$, $Ni_B$, $Mo_B$, and $Cu_B$ are the contents (% by mass) of corresponding elements Cr, Ni, Mo, and Cu in the low-carbon martensitic stainless steel pipes, and provided that the content of an element not contained is set to zero.

2. The method for producing a circumferential weld joint for low-carbon martensitic stainless steel pipes according to claim 1, further comprising the step of:
applying post-welding heat treatment to the circumferential weld joint after the multi-pass arc welding.

3. The method for producing a circumferential weld joint for low-carbon martensitic stainless steel pipes according to claim 1,
wherein the composition of the welding material for the circumferential weld joint further contains REM in the range of 0.3% by mass or less.

4. The method for producing a circumferential weld joint for low-carbon martensitic stainless steel pipes according to claim 2,
wherein the composition of the welding material for the circumferential weld joint further contains REM in the range of 0.3% by mass or less.

* * * * *